(12) United States Patent
Massonneau et al.

(10) Patent No.: US 10,007,338 B2
(45) Date of Patent: Jun. 26, 2018

(54) METHOD OF INTERACTION BY GAZE AND ASSOCIATED DEVICE

(71) Applicant: Suricog, Paris (FR)

(72) Inventors: Marc Massonneau, Tillières-sur-Avre (FR); Marc Swynghedauw, Paris (FR)

(73) Assignee: Suricog, Paris (FR)

( * ) Notice: Subject to any disclaimer, the term of this patent is extended or adjusted under 35 U.S.C. 154(b) by 58 days.

(21) Appl. No.: 15/029,157

(22) PCT Filed: Oct. 14, 2014

(86) PCT No.: PCT/IB2014/065307
§ 371 (c)(1),
(2) Date: Apr. 13, 2016

(87) PCT Pub. No.: WO2015/056177
PCT Pub. Date: Apr. 23, 2015

(65) Prior Publication Data
US 2016/0224110 A1 Aug. 4, 2016

(30) Foreign Application Priority Data

Oct. 14, 2013 (FR) ...................................... 13 59975

(51) Int. Cl.
*G06F 3/01* (2006.01)
*G06F 3/00* (2006.01)
(Continued)

(52) U.S. Cl.
CPC ............. *G06F 3/013* (2013.01); *G06F 3/005* (2013.01); *G06F 3/012* (2013.01); *G06F 3/167* (2013.01); *G06K 9/0061* (2013.01)

(58) Field of Classification Search
CPC ...... G06F 3/013; G06F 3/012; G06F 3/04842; G06F 3/011; G06F 1/163;
(Continued)

(56) References Cited

U.S. PATENT DOCUMENTS 4,568,159 A 2/1986 Baldwin
5,016,282 A 5/1991 Tomono et al.
(Continued)

FOREIGN PATENT DOCUMENTS

EP 1195574 A1 4/2002
WO 2005/052718 A2 6/2006
WO 2013/153538 A1 10/2013

OTHER PUBLICATIONS

International Search Report for PCT/IB2014/065307 dated Feb. 2, 2015 and translation (7 pages).

*Primary Examiner* — Sanjiv D Patel

(74) *Attorney, Agent, or Firm* — Shumaker, Loop & Kendrick, LLP

(57) ABSTRACT

Disclosed is an electronic device including a receiver of a piece of information sent by a gaze tracking device, which includes a marker forming a visual identification pattern, carried by a user moving in a real environment. In certain aspects, the received piece of information provides information about the direction of the user's gaze in a plane of reference of the gaze tracking device. At least one camera for acquiring an image of the marker, a memory for storing a digital representation of the environment in a plane of reference specific to the environment, and a processor configured so as, based on the piece of information of the image and the digital representation stored in the memory, to determine, in real-time, the direction of the user's gaze relative to the environment and/or the zone of the environment gazed at by the user may be provided herein.

26 Claims, 6 Drawing Sheets

(51) Int. Cl.
*G06F 3/16* (2006.01)
*G06K 9/00* (2006.01)

(58) Field of Classification Search
CPC ........ G02B 2027/0178; G02B 27/0093; G06T 19/006; G06T 2207/30204; G06T 2207/10016; G06T 2207/20201; G06T 5/002; H04N 9/316
See application file for complete search history.

(56) References Cited

U.S. PATENT DOCUMENTS

| | | | | |
|---|---|---|---|---|
| 8,854,282 B1* | 10/2014 | Wong | ........................ | G06F 3/14 345/7 |
| 2006/0227211 A1 | 10/2006 | Kotake et al. | | |
| 2008/0030461 A1* | 2/2008 | Matsui | .................... | G06F 3/011 345/156 |
| 2009/0196460 A1 | 8/2009 | Jakobs et al. | | |
| 2011/0310238 A1* | 12/2011 | Koh | ........................ | H04N 7/18 348/78 |
| 2012/0088581 A1 | 4/2012 | Mao et al. | | |
| 2012/0155713 A1* | 6/2012 | Arnaud | ................ | G06K 9/3216 382/106 |
| 2013/0076617 A1 | 3/2013 | Csaszar et al. | | |
| 2013/0265330 A1* | 10/2013 | Goto | ..................... | G06T 19/006 345/632 |
| 2013/0293530 A1* | 11/2013 | Perez | .................... | G06T 19/006 345/418 |
| 2013/0293580 A1* | 11/2013 | Spivack | ............. | G06Q 30/0643 345/633 |
| 2014/0085204 A1* | 3/2014 | Jahnke | .................... | G06F 3/013 345/158 |
| 2014/0247279 A1* | 9/2014 | Nicholas | ................. | G06F 3/011 345/633 |
| 2014/0292653 A1* | 10/2014 | Kamba | ................. | G06T 19/006 345/157 |
| 2015/0097772 A1* | 4/2015 | Starner | ................... | G06F 3/013 345/158 |
| 2015/0154758 A1* | 6/2015 | Nakazawa | ............. | A61B 3/113 382/103 |

* cited by examiner

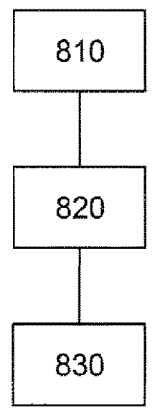
Fig. 6
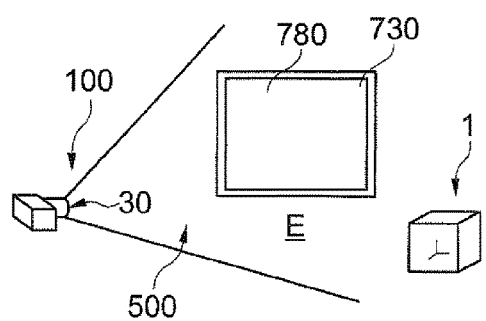
Fig. 7A
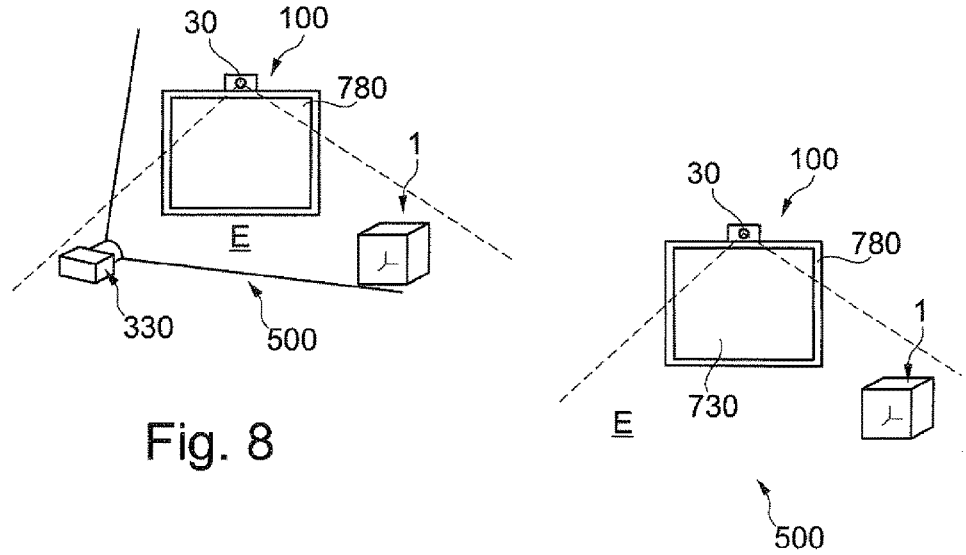
Fig. 8
Fig. 7B

METHOD OF INTERACTION BY GAZE AND ASSOCIATED DEVICE

The present invention relates to a method allowing a user to interact by gaze with a real environment in which he moves around as well as an interaction system and a device for tracking the gaze to carry out such a method.

The known gaze tracking devices make it possible to know the orientation of the gaze relative to the device (and therefore relative to the head if it is fixed on the head).

For applications using the display of a virtual environment (virtual reality, videogame, etc.) on a screen mounted on the head and secured to the gaze tracking device, the direction of the gaze relative to this virtual environment is perfectly known.

In other applications in which the user must retain his mobility and interact with a real or virtual object or a zone of a real physical environment, or a screen not fixed on the head, it is further necessary—to know what zone is being gazed at in the environment—to identify, at all times, the topological arrangement of the environment relative to the user and also to determine the position and direction of the device tracking the user's gaze relative to this environment.

This is in particular the aim of the present invention.

It is known to use a smart optical sensor, of the Wiimote type, and LED beacons mounted on glasses to determine the movements of a user's head relative to a screen, without measuring a position and an absolute orientation of the head relative to the screen.

Patent application US 2006/0227211 discloses a system for the spatial localization of objects provided with three visual markers and a gyroscopic sensor. The reconstruction of the position and orientation of the objects is done by combining visual data from a camera and onboard gyroscopic data, but the system does not perform any coupling with a digital mapping of the environment.

Furthermore, the use of gyroscopic sensors or accelerometers requires periodic recalibration of this type of system.

Patent application US 2013/0076617 A1 proposes an optical identification method for reconstructing the position and orientation of objects in a first room in order to establish an interaction link between screens, objects, bodies, gloves or rings. In this method using stationary cameras in the environment, the geospatial location of the objects does not use a digital representation of the adjacent space, but lighted markers indicating all of the objects that are open to interaction. Unmarked objects are ignored. This document does not mention an interaction between the environment and the user.

Methods requiring physical marking of all of the objects, screen, zones in space, etc. that one wishes to be able to identify and the corresponding calibration procedure are cumbersome and costly to carry out.

There is a need for a simple method making it possible to determine the position and orientation of the user relative to the objects or zones of interest in that environment, capable of generating an interaction with the user.

There is also a need to facilitate the corresponding calibration process.

It is also known to equip the user with a scene camera, which films a subjective view of the environment ("user view").

Patent application US 2012/155713 thus discloses an indoor geospatialization system, using passive markers positioned in a room and coding their position in space. The user wears a scene camera and a computing module that recognizes the markers and reconstructs his position and orientation relative to these markers, but is not interested in an interaction by gaze.

U.S. Pat. No. 4,568,159 relates to an onboard gaze tracking system making it possible to measure the direction of the gaze in the plane of reference of the head. The positioning of the head relative to the screen is deduced from the image seen by a scene camera onboard the frame; this document does not provide coupling with a digital mapping of the environment.

More generally, when one is interested in real-time interactions between a moving subject and his environment, wearing a scene camera presents the problem of requiring having a computing processor and battery onboard with the camera, and/or a wireless transmission system making the portable device heavier, slowing the acquisition speed and the availability of data, and reducing overall autonomy.

Furthermore, the real-time recognition of objects or zones of interest by processing images requires a computing power that is not yet available on onboard processors. Furthermore, the camera is not aligned with the visual axis of the user's eyes and cannot provide a satisfactory replacement for a gaze tracking device due to parallax errors.

There is a need for an onboard gaze tracking device that is light and does not require a wired connection.

U.S. Pat. No. 5,016,282 describes a gaze tracking system using a camera not carried by the user, in which the positioning of the head is determined by three markers positioned in a triangle on glasses. The structure of the marker pattern is non-coding, the markers are passive, and the system not being onboard, the user's mobility is greatly reduced.

Onboard systems, in particular mounted on the head, allow the user greater freedom of movement and the possibility of retaining full mobility. Thus, application US 2012/0088581 describes a gaze tracking system onboard 3D glasses to improve the perception of 3D on a screen alone. This document does not suggest interaction of the environment with the gaze.

Patent application US 2009/0196460 A1 describes a system comprising a measurement of the gaze direction using a lens provided with an infrared reflector worn by the eye, and a measurement of the direction/position of the head relative to an external module using three passive markers placed on the user's forehead and two stereoscopic cameras. This device does not provide an interaction with a three-dimensional environment.

Application EP 1,195,574 A1 describes a method in which an audio message is generated when, in the cockpit, a pilot looks in a reference direction, in a plane of reference connected to the cockpit. No memory storing a digital representation of the cockpit is described in this application.

There is a need to facilitate the detection and management of the interactions between a user and a real or virtual environment.

The invention aims to meet all or some of the aforementioned needs by using a position localization and orientation detection system for one or more users moving relative to a physical environment via one or more electronic recognition and computing devices making it possible to establish an interaction relationship between the gaze of these users and regions of interest of the environment or other users present in the environment.

In particular, the invention makes it possible to establish an interaction between the user's gaze and real or virtual objects represented on a display system of the environment. The display system for example has a known form and type such as a TV screen, computer screen, cell phone or tablet screen, a projection by video projection on a wall or screen, etc.

Electronic Device

The invention thus relates, according to a first of its aspects, to an electronic device including:
- a receiver of a piece of information sent by a gaze tracking device including a marker forming a visual identification pattern and carried by a user moving in a real environment;

the received piece of information providing information on the direction of the user's gaze in a plane of reference of the gaze tracking device,
- at least one camera for acquiring an image of the marker,
- a memory, storing a digital representation of the environment of the user in a plane of reference specific to the environment,
- a processor configured so as, based on the piece of information received, the image and the digital representation stored in the memory, to determine, in real-time, the direction of the user's gaze relative to the environment and/or the zone of the environment gazed at by the user.

"Environment" refers to a defined space in which the user moves.

The environment can be inside or outside. The environment is for example a closed space such as a room, hangar, cockpit or vehicle passenger compartment.

The environment may include several enclosed spaces, for example inside a building, in which the user moves and the system then preferably includes an electronic device for each enclosed space.

The environment may include a display device, in particular a screen, displaying virtual objects.

"Digital representation of the environment in a plane of reference specific to the environment" refers to a set of location data of the object(s) in said plane of reference, these data being known for example owing to a modeling method that is also known, in particular by a CAD or three-dimensional scan model, translated in the form of a three-dimensional digital representation stored in the memory of the electronic device. The modeling method may call on the techniques and algorithms known from photogrammetry by using the camera to move it in said environment, taking a set of photos, then, from a set of remarkable points shared by the different snapshots, building a 3D model of the environment.

The camera used to model the environment may be the camera of the electronic device or a third-party camera. Obtaining a digital model of the environment can thus be done using 3D scanning techniques via at least one depth camera operating in a near infrared mode, compatible with the emission wavelength of the markers, for example a camera of the Kinect® type.

The electronic device thus digitally knows a map of the environment.

"User" refers to a person wearing a gaze tracking device.

The user may have normal, poor or no eyesight.

The gaze tracking device can determine the direction of the gaze by observing at least one eye of the user, in particular by videooculography, electrooculography, "sclera coil" or any other known method.

The gaze tracking device can determine the direction of the gaze by observing both eyes of the user, in particular by videooculography, electrooculography, "sclera coil" or any other known method.

The direction of the user's gaze computed by the gaze tracking device can correspond to the optical axis of the eye, the visual axis of the eye or the vision cone of the fovea.

The gaze tracking device preferably includes an onboard wireless system, in particular mounted on a frame of the glasses type, a helmet, or HMD ("head-mounted display") video device on a user's head. Such a system onboard the frame makes it possible to determine the direction of the user's gaze in the plane of reference of the gaze tracking device, i.e., a plane of reference connected to the user's head.

The gaze tracking device includes a communication means, in particular wireless, for example of the RF, Bluetooth, Wi-Fi or other type, for sending at least one piece of information to the electronic device according to the invention. Preferably, the communication means is of the transceiver type.

Within the meaning of the invention, "camera" refers to any optical sensor including at least one camera, in particular an infrared or non-infrared camera, a 3D camera, a set of two calibrated stereoscopic cameras, or a camera equipped with a rotation device.

The camera can be associated with another sensor or positioning or orientation detection system, for example a GPS device, an accelerometer or a rate gyro.

The camera is for example an infrared camera.

The camera can include a bimodal, manual or automatic system for filtering incident light, which has the advantage of simplifying and accelerating the identification of the markers, as well as the calibration of the position of the electronic device relative to its environment, as outlined later. In a first embodiment, no filtration of the light is done. The camera is for example sensitive to the wavelengths of the visible and near infrared domain, in particular comprised between 380 and 1000 nm. In a second embodiment, a filter is placed on the optic of the camera and for example only allows wavelengths from the near infrared comprised between 700 nm and 1000 nm to pass. The filtering and the mode selection can also be done electronically, if applicable.

The camera is preferably provided with a two-dimensional optical sensor of the CCD or CMOS type.

The camera can be provided with a polarizing filter, the polarization of the light in particular being linear or circular.

The electronic device preferably includes a case incorporating the receiver, the camera, the memory and the processor, which can process, in real-time, the information received from the gaze tracking device and the images of the camera.

The electronic device can include an autonomous power supply system, in particular integrated in the case.

The electronic device can include a wireless communication system, configured to receive a piece of information from the gaze tracking device carried by the user by or each user. The wireless communication system can be of the RF, Wi-Fi, RFID, Bluetooth type, this list not being limiting. In one preferred alternative, the wireless communication system is also configured to send data to the gaze tracking device, for example to steer the markers in order to associate them with a particular identifier.

The electronic device can be connected, by a wired or wireless link, to a third-party computer. The electronic device can thus share spatialization and interaction data with a third-party computer.

In particular, the electronic device can be arranged to be connected, via the computer or directly to a screen, in particular to display images or messages under the action of the processor.

More generally, the electronic device can include an interface in particular in the form of a set of input(s) and output(s) integrated in the case, for example of the USB or FireWire port, audio output, video output or other type.

The interface or the wireless communication system can allow the exchange of data between the electronic device and various third-party systems, in particular a computer, screen, projector, sound broadcast system, robot, industrial facility, etc.

Aside from during the calibration phase, the electronic device can be stationary in the environment, in particular placed integrally with a stationary object of the environment.

The electronic device can also be integral with an object moving in the environment, in particular an object arranged to send its movement characteristics to the electronic device in real time.

The position of the electronic device allows it to have a global or partial view of the environment using the camera and the memory gives it access to the digital model of the environment.

Within the meaning of the present invention, "object" designates a geometric shape belonging to the environment and known by the model, which may or may not correspond to a physical object.

The electronic space is for example secured to a screen, the latter being stationary or moving.

Marker

Each user may have an associated coding pattern, using the marker of the gaze tracking device that he is wearing.

The marker can form a pattern that allows the electronic device both to identify and geospatialize the user.

The marker can be rigid.

The marker can include at least one light source emitting in the visible domain, the infrared domain and/or the near infrared domain. The light source can in particular be a periodic light source such as an LED or a side lighting optical fiber.

The emitted light can be polarized linearly or circularly. The light can be modulated in amplitude or frequency. The optical characteristics (wavelength, polarization, modulation) of the markers correspond to the optical characteristics of the camera of the electronic device.

The marker can be coded by an amplitude or frequency modulation of the light sources.

Independently or additionally, the marker can be coded by the geometric pattern formed by a particular arrangement of the light sources.

Preferably, the arrangement of the light sources allows the processor to use the projection invariance property, which is reflected by invariant measurable values in space and in 2D projections. This property, in particular described by Meer in the article "Efficient Invariant Representations" [International Journal of Computer Vision 26(2), 137-152 (1998)] and Bergamasco in "Pi-Tag: A Fast Image-Space Marker Design Based on Projective Invariants" [Machine Vision and Applications August 2013, Volume 24, Issue 6, pp 1295-1310], is particularly advantageous to simplify and accelerate the recognition and reconstruction algorithms for patterns of the markers in space. Indeed, depending on the complexity of the sought patterns, this recognition can be very costly in time and computing power. In particular, in the case of an environment including several users, or with a brightness producing very noisy images, for example due to use outdoors, the brightness of the sun and reflections on windows, indoor lighting particularly of the neon type, etc., the image received by the camera includes a large number of light points among which the processor must recognize the markers.

Thus, the marker preferably includes at least four light sources, in particular at least four collinear periodic light sources or five coplanar periodic light sources, no triplet of points of which is collinear.

The marker can include a non-periodic light source.

The marker can include a side lighting optical fiber. The fiber can be partially concealed and in particular form light points and/or light segments.

The marker can in particular form a pattern including at least two non-collinear line segments. These segments may or may not form simple structures, in particular polygonal (square, rectangle).

Gaze Interaction System

According to another of its aspects, the invention relates to a gaze interaction system between one or more users and a real environment in which they are moving, the system including:

a portable gaze tracking device identifiable by a visual marker, carried by each user, at least one electronic device as previously described.

The interaction system can include several electronic devices configured to exchange data with one another wirelessly.

The interaction system can include an interaction link established between the gaze of the user and a visual representation of digital content, displayed in a format known by the display device of the environment, for example a TV screen, a computer screen, a cell phone screen or computer tablet screen, or by video projection on a wall or screen, this list not being limiting.

More generally, the interaction system can include an interaction link established between the gaze of the user and a zone of the space previously defined as "zone of interest".

The "gazed at zone" can be determined by the processor, in particular among the predefined zones of interest.

The interaction system can include an audio device intended to emit an audio message to the user.

The audio device can be worn by the user.

The audio device can be a helmet or earphones.

The triggering of the emission of an audio message and/or its content can be related at least to the direction of the user's gaze relative to the environment and/or the zone of the environment gazed at by the user, and in particular linked to at least the existence of an interaction link established between the user's gaze and a zone of interest.

The interaction system can include a button, also called pushbutton, intended to be actuated by the user to trigger or stop the emission of the sound message.

The interaction system can include a light indicator visible by the user, in particular carried by the user, in particular able to light up to signal to the user that he is gazing at a zone of interest for which an explanatory audio message exists and can be listened to if the user requests it, for example by acting on the pushbutton.

The interaction system can include a switch having an "on" state intended to activate the audio device and/or the portable device for tracking the user's gaze and an "off" state intended to deactivate the audio device and/or the portable device for tracking the user's gaze.

The pushbutton can for example trigger the emission of a sound message relative to the zone of interest only if it is simultaneously detected that the user is looking at the zone of interest, the switch is in the "on" state, and the user actuates the pushbutton, for example by pressing on it.

When the switch is in the "off" state, the audio device and/or the portable gaze tracking device is deactivated. No sound message can be emitted, even when the user actuates the pushbutton.

In the case of a plurality of users, the interaction system can include one audio device as previously described per user. It can also include one switch per user, and/or one pushbutton per user, and/or one light indicator per user, as previously described.

Zone of Interest

Each zone of interest can be identified by a unique identifier known by the memory.

The memory can include data associated with at least one zone of interest.

The zone of interest is for example defined by part of the space defined by the environment, in particular all or part of a modeled physical element, in particular a wall, an opening such as a door, a piece of furniture, an object, a switch, a screen, an indicator, etc.

The zone of interest can be mobile and may or may not be identifiable by a visual marker.

The zone of interest can belong to a moving agent having its own operation, moving in the environment, for example a robot, a drone or a vehicle. The agent can include a set of internal sensors (rate gyro, accelerometer, GPS, etc.) expressing a direction and/or a position relative to its own internal plane of reference. The agent for example includes a robotic arm or a steerable camera, which it steers internally and the position and orientation characteristics of which it knows, expressed in its own plane of reference.

In one preferred embodiment, the agent includes a wireless communication means configured to exchange information with the electronic device.

Also preferably, the agent includes a visual marker, in particular bearing a coding pattern observable by the camera to allow the electronic device to recognize the agent and determine its position and/or orientation relative to the plane of reference of the electronic device.

The agent's marker may or may not be of the same type as the marker of the gaze tracking device.

The zone of interest can be stationary in the environment, i.e., not having intrinsic mobility. A stationary zone of interest can not include a visual marker.

The environment for example includes a screen having one or more zones of interest.

The zone of interest can be a point, a zone surrounding a point, a surface or a volume.

The zone of interest is for example defined by a rectangular zone such as a frame, or screen, anchored on a wall or table or by a three-dimensional physical object or by a volume around a marker for example serving to diagram a robot or vehicle carrying the marker.

The zone of interest can be virtual, for example defined by part or all of the display zone of the screen, or by a virtual object displayed on a screen. The electronic device can be connected to a computer giving the instantaneous position of the virtual object, which for example appears on the screen, moves, then disappears.

As will be specified later, one or more interaction rules can be associated with the zone of interest.

Portable Gaze Tracking Device

According to another aspect, the invention relates to a portable gaze tracking device, in particular designed to exchange with an electronic device according to the invention, as previously defined, including:
 a frame, in particular of the glasses type, for fastening on a user's head,
 an onboard computer making it possible to determine the direction of the user's gaze in the plane of reference of the head,
 a marker including at least four light sources forming a visual identification pattern.

The invention also relates to a portable gaze tracking device intended to exchange with an electronic device according to the invention, including:
 a frame, in particular of the glasses type, for fastening on a user's head,
 an onboard computer making it possible to determine the direction of the user's gaze in the plane of reference of the head,
 a marker including a side lighting optical fiber forming a visual identification pattern.

According to another aspect, the invention relates to a portable gaze tracking assembly, in particular intended to exchange with an electronic device according to the invention, including:
 one or more snapping and/or tightening systems, intended to fasten, in particular removably, at least part of the portable gaze tracking assembly, in particular all of the portable gaze tracking assembly, on a frame, in particular of the glasses type, and/or on one or more pieces of glass carried by the frame, for fastening on a user's head,
 an onboard computer making it possible to determine the direction of the user's gaze in the plane of reference of the head,
 a marker, in particular including at least four light sources or a side lighting optical fiber, forming a visual identification pattern,
the portable gaze tracking assembly forming a gaze tracking device, in particular a device according to the invention, when it is fastened on the frame and/or on the piece(s) of glass.

The portable gaze tracking device and/or the portable gaze tracking assembly can, prior to its implementation, be calibrated based on the user, for example by asking the user to stare at one or more predefined points at specific moments, to follow a moving point or to stare at a stationary point while performing a circular movement of the head.

This calibration can be repeated after each fastening of the portable gaze tracking assembly on the frame and/or before each use of the portable gaze tracking device.

The portable gaze tracking device and/or the portable gaze tracking assembly can include one or more optical sensors.

This or these optical sensors can be one or more cameras, in particular one or two cameras, which can be infrared cameras.

In the case of several optical sensors, the latter can be positioned facing the same eye or facing two different eyes once the frame is in place on the user's head.

The optical sensor(s) can be associated with one or more LEDs, in particular infrared.

The calibration can include the orientation of the optical sensor(s) toward the eye(s), obtaining at least one image, checking the quality of the image and indicating to the user that calibration has been done correctly, in particular by sending a sound or light signal of an indicator.

The portable gaze tracking device and/or the portable gaze tracking assembly can include several markers, such that at least one of them remains visible by the electronic device in the various possible orientation and position configurations of the user in the environment.

The portable gaze tracking device and/or the portable gaze tracking assembly can include two markers placed fixed relative to one another, for example on the right and left sides of the front part of glasses used as a frame.

The portable gaze tracking device and/or the portable gaze tracking assembly can include a battery.

The portable gaze tracking device and/or the portable gaze tracking assembly can include a transmitter, in particular wireless, for sending the electronic device a piece of information relative to the direction of the user's gaze.

The onboard computer can include an electronic circuit that is fixed or intended to be fixed on the frame.

In one alternative, the onboard computer can include an electronic circuit that is fixed or intended to be fixed on the frame and a portable base module carried by the user somewhere other than on the frame.

Preferably, the entire gaze tracking assembly is fixed on the frame.

In one alternative, the entire portable gaze tracking assembly is fixed on the frame, with the exception of the base module.

The computer and/or one or more optical sensor(s) and/or a battery and/or a wireless transmitter can be as described in application PCT/IB2013/052930.

The frame and/or the piece(s) of glass can be manufactured so as to receive the computer and/or the marker and/or the optical sensor(s) and/or the battery and/or the wireless transmitter and/or the snapping and/or tightening systems.

The frame can in particular include notches provided for positioning and/or fastening of the snapping and/or tightening system(s).

The portable gaze tracking device can include a portable gaze tracking assembly according to the invention.

The portable gaze tracking assembly can be mono- or binocular, i.e., it is designed to be fastened on one or two pieces of glass, respectively, and/or on the part of the frame that surrounds them.

The portable gaze tracking device can be manufactured so as to adapt to a frame and/or to one or several pieces of glass with a particular shape.

In one alternative, the portable gaze tracking assembly can be manufactured so as to adapt to any type of frame and/or piece(s) of glass.

The portable gaze tracking assembly can, in a first alternative, be fixed directly on the frame and/or on one or several pieces of glass only.

The portable gaze tracking assembly can, in a second alternative, be fixed directly on a frame and/or on one or several pieces of glass, and on at least one other device.

The portable gaze tracking assembly can, in a third alternative, be fixed indirectly on a frame and/or on one or more pieces of glass by means of another device.

Said other device of the second and third alternatives can for example be a smart glasses element or a head-mounted display (HMD) system. The fastening can in particular be done via a sensor or a display present on the frame or pieces of glass.

The portable gaze tracking assembly can be fixed on the frame and/or on the piece(s) of glass directly or indirectly, in particular via at least one intermediate part.

In the case of a portable gaze tracking assembly including a tightening system, the latter may or may not be provided with screws.

The frame can include a front part and two branches.

The portable gaze tracking assembly can include a snapping and/or tightening system fastened on the front part of the frame and/or on one or more pieces of glass.

The portable gaze tracking assembly can include several snapping and/or tightening systems fastened on the front part of the frame.

The portable gaze tracking assembly can include at least one snapping and/or tightening system fastened on the front part of the frame and/or on one or more pieces of glass and at least one snapping and/or tightening system fastened on at least one branch.

The portable gaze tracking assembly can include at least two snapping and/or tightening systems connected by a wire, for example a power supply wire and/or information exchange wire.

The portable gaze tracking assembly can include a snapping and/or tightening system including at least one lower relief, in which the bottom of the frame and/or at least one piece of glass is placed, and at least one upper relief, in which the top of the frame and/or at least one piece of glass is placed.

The portable gaze tracking assembly can at least partially marry the shape of at least part of the frame and/or piece(s) of glass.

The snapping and/or tightening system can include at least two arms so as to grip a piece of glass and/or the frame between them. One of the two arms can be tiltable.

The portable gaze tracking device can include one or several pieces of glass. The portable gaze tracking device can on the contrary have no piece of glass. The piece(s) of glass can be transparent, corrective or not, optionally for sun protection.

The piece(s) of glass can be black, in particular when the user has poor or no vision.

The frame can in particular be a glasses frame or a visor of a helmet on which information is projected or a device fixed on the face using a mask, for example of the night vision device type.

Gaze Interaction Method

According to another of its aspects, the invention relates to a gaze interaction method between a user and a real environment in which the user is moving around, using a system according to the invention as previously defined.

The method can include the following steps:

a. reception, by the electronic device according to the invention, of a piece of information that is sent by a portable gaze tracking device carried by the user, b. acquisition of at least one image of a marker of the portable device by a camera, c. determination by the processor, from the piece of information, of the image and data stored in the memory, the direction of the user's gaze relative to the environment and/or the zone of the environment gazed at by the user.

The electronic device processes the information received from the gaze tracking device in real time.

The information received in step a) for example provides information about the direction of the user's gaze in a plane of reference of the gaze tracking device.

The information can include an identifier of the portable gaze tracking device. The identifier can correspond to the coding pattern of the marker, the memory for example storing a match table between the identifiers and the coding patterns.

Each user may have a corresponding unique identifier sent to the electronic device by the gaze monitoring device that said user is carrying.

The information can also provide a time indication of the measurement moment (for example, date and time) of the gaze direction.

Step b) for acquiring at least one image of a marker of the portable device can include image filtering.

The processor can thus use a decoding algorithm known by those skilled in the art to differentiate the marker(s) from other light points of the image.

In particular, the SLAM method and the SolvePnP (Opencv) method described by F. Moreno-Noguer, V. Lepetit and P. Fua in "EPnP: Efficient Perspective-n-Point Camera Pose Estimation" and by X. S. Gao, X.-R. Hou, J. Tang and H.-F. Chang; in "Complete Solution Classification for the Perspective-Three-Point Problem" make it possible to reconstruct five degrees of freedom of a marker including four periodic light sources. The combination of two markers forming different non-collinear and integral patterns makes it possible to reconstruct the set of six degrees of freedom in the plane of reference of the device and thus identify the user by the gaze tracking device he is carrying, while determining the instantaneous orientation of the gaze in the plane of reference of the environment. One is no longer linked to a relative plane of reference of the gaze tracking device.

For example, for a marker including four collinear points, in two-dimensional projection, the four collinear points still form a line segment. The identification of sets of points aligned in the image received from the camera makes it possible to select the line segments in space. Among the set of points seen by the camera, the processor recognizes the combinations of four light points that correspond to a known pattern and thus therefore respect a proportionality constraint depending on the geometric pattern.

From the two-dimensional projection of four collinear points of a marker, it is possible to reconstruct five of the six degrees of freedom of the marker in space (a line being invariant by rotation around itself, this degree of freedom is not accessible).

At each moment and in real time, the electronic device, by image processing done by the processor, identifies the markers in the image, recognizes the known patterns that are present and reconstructs the position and orientation of the gaze tracking device in the plane of reference of the electronic device.

The electronic device has access at all times to a digital mapping of the environment in which it is located (geometry, geography) or the geometric structure of the object to which it may be secured, in particular a screen. Furthermore, it knows its instantaneous position and orientation in this environment.

The processor can thus, for each piece of information received from the gaze tracking device providing information on the direction of the user's gaze in a plane of reference of the gaze tracking device at a given moment, process the corresponding image observed by the camera and determine, from the information and data from the memory, the direction of the user's gaze relative to the environment.

The processor can determine the zone gazed at by the user by computation. This "gazed at zone" can be a zone of the environment toward which the user's gaze points or a zone of the environment toward which the user's eyes converge in 3D, or be computed in a more complex manner.

The processor can determine whether a zone of interest is gazed at by the user in particular if it has a surface or volume intersected by the direction of the gaze or, when the direction of the gaze is defined by a vision cone, whether the zone of interest has a non-zero intersection with the volume of the cone.

Using these indications and the three-dimensional reconstruction of the position and orientation of the patterns in its plane of reference, the electronic device can place different users in an interaction relationship or users with zones of interest, in particular objects, present in the environment.

The method preferably includes a computation step by the processor, as a function of the gazed at zone and at least one programmed rule, of at least one result in particular embodied by a change in state of a logic output, the transmission of a datum or the stop of its transmission, a visual, audio, mechanical or electric effect.

A programmed rule determines a result when a condition is met.

The absence of effect when a predefined zone is gazed at is considered a particular result.

It consists for example a rule, when the user gazes at a predefined zone, of triggering the sending of a message, for example audio, in particular in a helmet or earphones carried by the user.

Another rule for example consists of triggering another effect when the user does not gaze at a predefined zone for a defined time interval.

Another rule for example consists, when the user gazes at a predefined zone, of triggering the lighting of a light indicator, in particular perceptible by the user, for example present on a case carried by the user.

Another rule for example consists, when the user gazes at a predefined zone and shares his interest in receiving a piece of information, in particular audio, particularly by actuating a button, in triggering the broadcast of said information.

Another rule for example consists of stopping the sound message when one the one hand the user is gazing toward a zone other than a predefined zone, on the other hand, a piece of information, in particular sound, is sent to him, and furthermore the user shares his interest in no longer receiving the sound message, in particular by actuating a button.

Another rule for example consists, when on the one hand the user gazes toward a predefined zone, on the other hand a piece of information, in particular sound, is sent to him, and still furthermore the user shares his interest in no longer receiving the sound message, in particular by actuating a button, of stopping the sound message and allowing the resumption thereof for a certain length of time, in particular less than or equal to 30 minutes, if the user shares his interest in resuming it, in particular by actuating a button, particularly when the user gazes at the predefined zone at the time of that actuation.

Several programmed rules can be accumulated. Thus, the method can include the computation by the processor, based on the gazed at zone and several programmed rules, in particular as defined above, of at least one result in particular embodied by a change in logic output state, the transmission of a datum or the stop of its transmission, a visual, audio, mechanical or electric effect, the effect being exogenous or endogenous to the user.

The effect of the interaction between the gaze and the environment can be exogenous to the user, for example a projection of the wall, an audio broadcast by speakers, powering off or on a piece of equipment, etc., or endogenous to the user, via a wireless communication with the user, for example a visual and/or sound transmission broadcast on a screen and/or helmet worn by the user.

The processor can generate a result depending on whether the zone of interest is gazed at by the user. This result for example being embodied by a change in state of a logic output, the transmission of a datum or the stop of its transmission, a visual, audio, mechanical or electric effect.

This result can in particular be embodied by the transmission or stop of the transmission of an audio message transmitted exogenously or endogenously to the user, in particular endogenously.

The interface for the wireless communication system of the electronic device for example makes it possible, depending on the result, to trigger an action on a third-party system, in particular a screen, a projector, a sound broadcasting system, a robot, an industrial installation, etc.

The method according to the invention can in particular be used to interact with screens present in the user's environment.

The method and the device according to the invention, as described above, can be used to select a zone or the entire screen present in the environment, for example a window or an object moving on the screen, or one screen from among several, by using the gaze, alone or combined with a mouse.

Such a use can in particular be especially useful in the case where the environment includes several screens visible by the user. The method and a device according to the invention can make it possible to select the desired screen, which can make it possible to accelerate and facilitate the transition from one screen to another.

It is thus possible, owing to the invention, to monitor what the user is gazing at on the screen.

The method according to the invention can be used to display or hide a virtual object, move, or show visually, for example underlining, making blink, highlighting, changing the color of, a zone of interest on the screen that has been gazed at by the user, or on the contrary a zone of interest on the screen that has not yet been gazed at by the user, until the latter changes the direction of his gaze to observe it.

More generally, the electronic device can display images or patterns on the screen.

Update of the Zones of Interest or Interaction Rules

The method can further include a step for defining and/or updating zones of interest stored in the memory and/or interaction rules. This step can be carried out via a screen directly connected to an interface of the electronic device or via a third-party computer connected to the electronic device.

This step can be carried out remotely on a computer connected to the electronic device owing to an appropriate software publisher. The publisher for example displays a graphic representation of the three-dimensional model of the environment on a screen, in particular a screen present in the user's environment, with all of the traditional rotation, translation, scale change, etc. functionalities. In this publisher, the user can for example use a mouse to select and define the zones of interest of the environment from the displayed model.

Owing to this publisher, it is further possible to associate, with each zone of interest, an interaction rule including a condition so that an interaction occurs and a result of the interaction depending on whether the condition is met.

Preferably, all of the geometric, topological, identifying and interaction rule characteristics of each zone of interest are sent to the memory of the electronic device to be stored therein.

The data of the memory, linked to the model of the real environment and/or the interaction rules, are for example accessible in the form of XML digital coding.

Once the base is updated, the electronic device can operate autonomously without being connected to a third-party computer.

In addition to the preceding, the publisher can also display a virtual space and similarly make it possible to define and/or modify a zone of interest corresponding to a virtual object, which can be displayed on a screen of the environment. Likewise, an interaction rule can be associated with such a zone of interest.

Calibration Method

According to another of its aspects, the invention relates to a method for calibrating an electronic device according to the invention as previously defined, for use in an environment allowing the electronic device to compute its position in a plane of reference of the environment, in particular relative to an object of said environment, the method including at least the following steps:

a. acquiring a first image corresponding to the simultaneous viewing, by the camera of the electronic device or a third-party camera, of a marker in a calibration position and a reference object of the environment, b. the marker being stationary in the calibration position, acquiring, via the camera of the electronic device secured to the reference object, a second image of the marker.

The electronic device can be intended to be fastened during normal operation to a reference object of the environment, in particular a screen of the environment.

During step a), an object provided with a marker, for example a gaze tracking device held in the hand or placed on a foot, is placed in a fixed position near the reference object. The camera is then placed in a first mode, with a wide sensitivity range, and positioned to observe both the reference object and the marker. The reference object preferably has a simple geometric shape. The processor, knowing the intrinsic characteristics of the camera, can, through known mathematical methods, for example described in 2006 in "Real-Time Model-Based SLAM Using Line Segments" by Andrew P. Gee, Walterio Mayol-Cuevas, reconstruct the position and orientation of the reference object in a first plane of reference specific to the electronic device. The camera also sees the marker, making it possible in the same way for the processor to reconstruct the position and orientation of the marker in the same plane of reference of the electronic device. The processor next deduces the relative position and orientation of the marker and the reference object relative to one another therefrom.

Once this first step is carried out, the camera is placed in a stationary and secured manner on the screen, and a filter is further preferably placed on the camera to facilitate the observation of the marker. The acquisition of the second image by the camera makes it possible to recognize the new position and orientation of the marker in the plane of reference of the camera, i.e., of the electronic device. The processor of the electronic device, knowing the relative position and orientation of the marker relative to the reference object, the relative position and orientation of the electronic device and the marker, next uses triangulation to compute the position and orientation of the electronic device relative to the reference object.

The operational phase can begin. At each moment, the electronic device reconstructs the position and orientation of the user carrying the gaze tracking device in its own plane of reference, combines these data with the information received from the gaze tracking device, then translates it in terms of position in the plane of reference of the environment.

The electronic device here remains secured to the reference object, the latter being stationary or movable in the environment.

In one alternative, the calibration method of the interaction system is carried out using a material and method making it possible to scan the environment, simultaneously with the obtainment of a digital model of the environment. The calibration/modeling method can thus call on 3D scanning techniques using a depth camera operating in a near infrared mode, compatible with the emission wavelength of the markers, for example of the Kinect® type. A marker, for example placed on a gaze tracking device, is stationary in the environment in the calibration position when the room is scanned. The scanning equipment reconstructs the 3D space, while seeing the marker in the environment, and can therefore position this gaze tracking device relative to the digital model. At the same time, the electronic device that one seeks to calibrate is placed in a stationary manner in its usage position, in particular secured to a reference object. It sees and reconstructs its relative position and orientation with respect to the marker in the calibration position. These two indications allow the electronic device to reconstruct its position and orientation in fine relative to the environment in the reconstructed digital model.

Method for Tracking the Interest Shown by One or More Visitors

According to another of its aspects, the invention relates to a method for tracking the interest shown by one or several visitors equipped with a gaze tracking device in a given place, including storage of data associated with the gaze of each visitor by the memory of the gaze interaction system according to the invention.

The method can include identification of one or several zones of interest, the storage of data associated with the gaze of each visitor being relative at least in part to each zone of interest.

The method can include an export toward a data processing system.

DESCRIPTION OF THE FIGURES

The invention will be better understood upon reading the following detailed description of example embodiments of the invention, and examining the appended drawing, in which:

FIG. 6 is a block diagram of a calibration method for a system according to the invention, FIGS. 7A and 7B show an example environment during the implementation of the calibration method of FIG. 6, FIG. 8 is the implementation of an alternative calibration method.

FIG. 1 shows an electronic device 100 assuming the form of a case 110 including a camera 30, a processor 80 and a memory 60, as well as a receiver 20 for communicating wirelessly with a gaze tracking device 50 carried by a user. In the illustrated preferred alternative, the receiver 20 assumes the form of a wireless input and output communication system, having the possibility of sending information to the gaze tracking device and/or to other outside peripherals.

Figure 1:
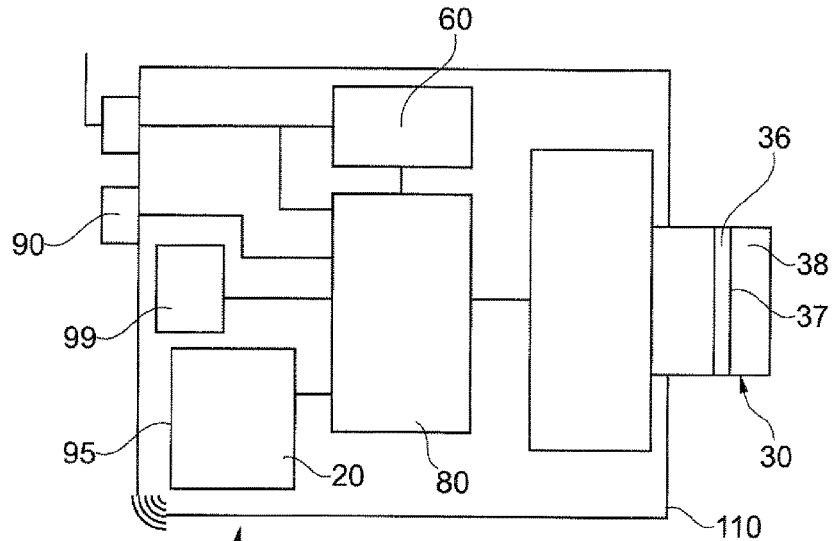
FIG. 1 diagrammatically and partially shows an electronic device according to the invention, FIG. 2 diagrammatically shows the electronic device of FIG. 1 in an environment.

The case also incorporates a power source 99. It is advantageous to have a power source 99 integrated in the case of the device, as in the illustrated example, when one wishes to move the latter, in particular to scan the environment.

In other alternatives that are not shown, the device is powered by a power source integral with the case but outside the latter or is connected directly to the power grid.

The camera 30, for example a CMOS camera, is at least partially integrated in the case 110. It includes here, protruding from the case 110, an optical system 38 for polarizing the light and a bimodal filtration system 37 of the light using a removable filter 36. Thus, in a first mode, the filter is missing and the camera is sensitive to the visible wavelengths. In the second mode, corresponding to normal operation, the filter 36 is in place to allow only the IR or near IR wavelengths to pass.

Figure 2:
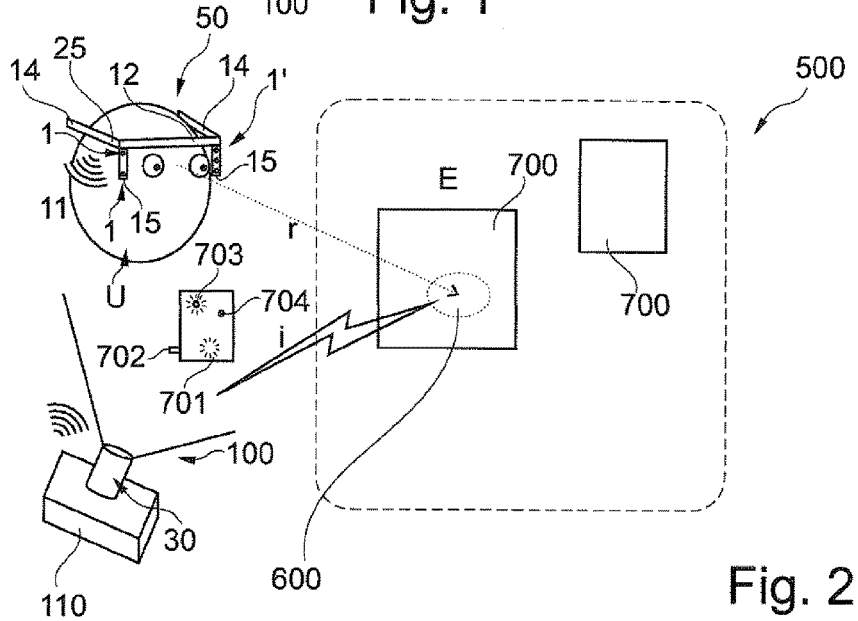

FIG. 2 shows a gaze interaction system 500 between a user U wearing a gaze tracking device 50 on the head and an environment E that includes several zones of interest 700. The gaze interaction system 500 includes the electronic device 100 of FIG. 1, positioned so that the camera 30 can see markers 1 and 1' of the gaze tracking device 50.

The gaze interaction system 500 includes an audio device 701 designed to emit an audio message for the user, a pushbutton 702 intended to be actuated by the user to trigger or stop the emission of the sound message, a light indicator 703 visible by the user to indicate to the user that he is looking at a zone of interest for which an explanatory audio message exists and can be listened to if the user requests it by acting on the pushbutton, and a switch 704 having an "on" state intended to activate the audio device 701 and/or the portable gaze tracking device 50 of the user and an "off"

state intended to deactivate the audio device 701 and/or the portable gaze tracking device 50 of the user.

Figure 3A:
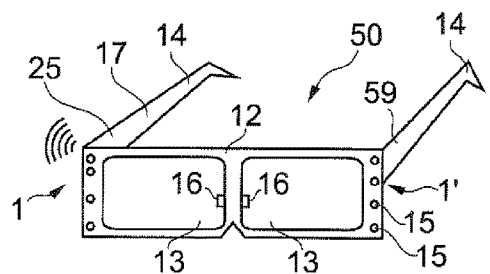
FIG. 3A is a partial diagrammatic perspective view of a gaze tracking device belonging to the electronic device of FIG. 1, FIGS. 3B and 3C illustrate alternatives of the gaze tracking device.

The gaze tracking device 50 is illustrated in FIG. 3A alone. It assumes the form of glasses intended to be worn by the user, including branches 14 resting on the ears and a central part 12 resting on the nose, the pieces of glass 13 of the glasses being able to include an antireflective coating.

To determine the direction of the gaze r in its own plane of reference, the gaze tracking device 50 includes, in the described example, two infrared LEDs 16 positioned in the central part 12, on either side of the nose and each oriented toward one of the user's eyes, as well as cameras, not shown, able to detect infrared radiation and oriented toward each of the user's eyes, to acquire images of the latter.

The gaze tracking device 50 also includes an electronic circuit 17 making it possible to process the images acquired by its cameras and a wireless transmitter 25 for sending the electronic device 100 a piece of information 11 relative to the direction of the gaze, this electronic circuit 17 and the wireless transmitter 25 for example being housed in a branch 14 of the device 50. The gaze tracking device 50 further includes an autonomous power source 59, for example positioned in the other of the branches 14 and giving it sufficient autonomy so that it does not have to be recharged for an acceptable length of time, for example several hours, or even an entire day.

The piece of information 11 preferably includes both data regarding the direction of the gaze in the plane of reference specific to the device 50 at a given moment and data making it possible to identify the user.

The gaze tracking device 50 also includes two markers 1 and 1' each including four periodic light sources 15 in the form of infrared LEDs placed on the front part of the glasses to be visible from the outside and forming a pattern that makes it possible to identify the device 50, therefore the user U. The markers 1 and 1' are positioned on each side, right and left, of the central part 12.

The identifier transmitted in the information 11 corresponds to the pattern coding the markers 1 and 1'.

These markers, oriented so as to be visible by the camera 30 of the electronic device 100, also allow the processor 80 to determine, from the processing of the image 33 observed by the camera 30 and the data of the memory 60, the position and orientation of the gaze tracking device 50 relative to the environment E. The aligned arrangement of the four light sources 15 of each marker 1 and 1' advantageously allows the processor to take advantage of the invariance by two-dimensional projection. In an alternative that is not illustrated, the gaze tracking device includes a single coding marker with four LEDs that are collinear and a second non-coding marker, for example including one or two LEDs, used to facilitate the determination of the orientation of the gaze tracking device.

Figure 3B:
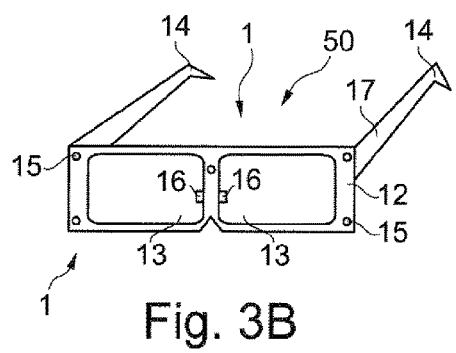

The alternative gaze tracking device 50 illustrated in FIG. 3B includes a single marker including five infrared LEDs, positioned in a coplanar manner whereof no triplet of LEDs is collinear.

Figure 3C:
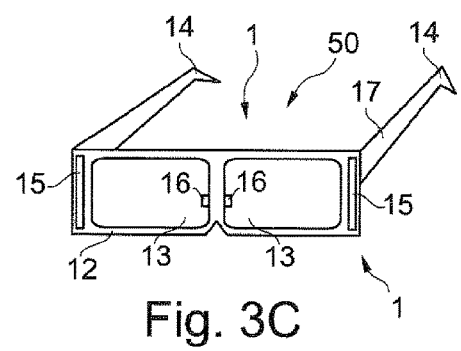

The gaze tracking device 50 illustrated in FIG. 3C includes a marker 1 including two side lighting optical fibers. The marker 1 includes two non-collinear parallel segments forming two opposite sides of a rectangle in illustrated example.

Figure 4:
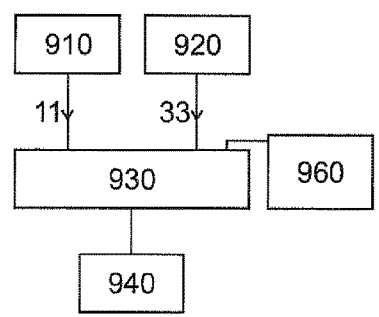
FIG. 4 is a block diagram illustrating a gaze interaction method, according to the invention.

We will now provide a detailed description in reference to FIG. 4 of the steps of a method according to the invention.

At a moment t, during step 910, the gaze tracking device 50 carried by the user emits, in particular at a frequency between 30 and 200 Hz, a piece of information 11 providing information on the direction of the gaze relative to a plane of reference specific to the gaze tracking device 50.

Preferably, the piece of information 11 also contains an identifier making it possible to recognize the user of the carrier of the gaze tracking device 50, in particular corresponding to a pattern coding one or several markers 1, 1' of the gaze tracking device 50.

During step 920, the camera 30 observes an image 33 of the marker of the gaze tracking device 50 in the environment E. The image 33 provides an overall view of the environment. The image 33 also provides a representation of the marker 1 making it possible both to identify the user and to know the position and orientation of the device 50 relative to the electronic device 100. Step 920 can take place just before or just after step 910. Preferably, steps 910 and 920 are simultaneous.

In step 930, the processor 80 analyzes the image 33 and deduces the position and orientation of the gaze tracking device 50 therefrom, and by combining with the piece of information 11 and the data stored in the memory 60, determines, in a plane of reference of the environment E, the direction of the gaze of the user U and the zone 600 of the environment E that is gazed at by the user. The processor 80 in particular determines whether the gazed at zone corresponds to a zone of interest 700.

The processor 80 thus computes the zone 600 gazed at in the environment, and verifies whether this zone corresponds to a zone of interest 700.

Preferably, based on the gazed at zone 600, the electronic device 100 determines, in step 940, at least one result by applying at least one programmed rule. If one or several interaction conditions are met, a result is sent to the interface 90 or the wireless connection 95 to trigger an action.

Preferably, steps 910 to 940 are done completely onboard, i.e., the computations are done by the processor 80 of the electronic device 100, the communications between the electronic device 100 and the gaze tracking device 50 or with one or several pieces of output equipment are done by wireless link from the interface 95.

It is not outside the scope of the present application to use wired connections at the output of an interface 90, or a mixed solution.

In one alternative, part of the processing of the data is done by a third-party computer with which the processor 80 exchanges data.

The method preferably includes a step 960 for defining or updating the memory 60 using a software publisher.

Figure 5:
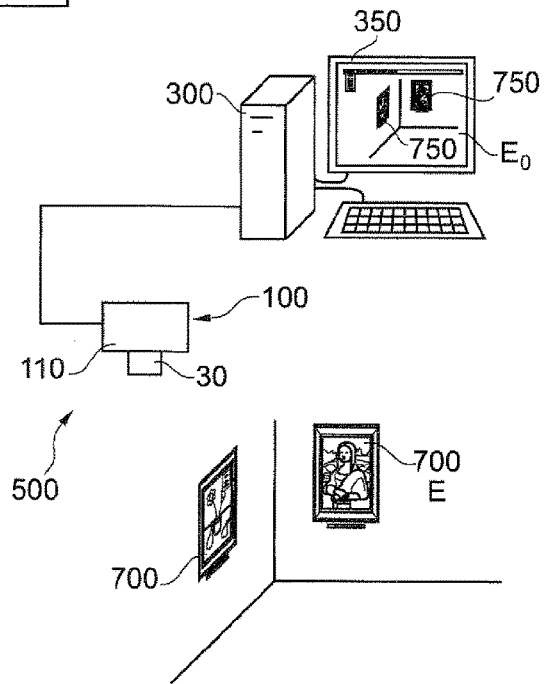
FIG. 5 illustrates a step for defining and/or updating zones of interest of an interaction method according to the invention.

This step is for example done via an interface of the electronic device or via a third-party computer connected to the electronic device 100, as illustrated in FIG. 5. The electronic device 100 is connected, via a computer 300, to a screen 350 to display a representation $E_0$ of the digitized model of the environment E.

The publisher makes it possible to select zones 750 displayed on the screen 350 to define zones of interest 700 of the environment and associated interaction rules. The third-party computer 300 transfers the spatial and interaction data thus defined or updated to the memory 60 and the electronic device 100 can operate autonomously.

Before the use of a system 500, the electronic device 100 must be calibrated to be able to compute its position in a plane of reference of the environment E and to be used in the environment E.

FIG. 7A illustrates a first step 810 of a block diagram of FIG. 6 corresponding to an example calibration method. A marker 1 is placed in the environment E close to a reference object 780, for example a screen 730 on which a pattern is displayed, an image or a known color of the electronic device, for example a uniform color as illustrated, facilitating the recognition of the active zone of the screen by image processing means. The camera 30 records a first image 34 of the marker 1 and the screen 730, making it possible to compute, in a plane of reference of the electronic device 100, the orientation and position of the marker 1 and the screen 730.

In step 820, the electronic device 100 is fastened on the screen 730, while the marker 1 is not moved.

In step 830, the camera 30 takes a second image 35 of the environment in which the marker 1 is visible. The latter having moved in the plane of reference of the electronic device, from the change in orientation and position of the marker 1 in the plane of reference of the electronic device 100, the processor 80 deduces the coordinates of the marker 1 in a plane of reference connected to the environment E.

The electronic device 100 remains secured to the reference object 780, here the screen 730, and the gaze tracking device 50 can then be moved; the processor 80 can compute, at any time, the position and orientation of the gaze tracking device 50 in the plane of reference connected to the environment E.

FIG. 8 illustrates another example calibration of an interaction system 500 using a third-party camera 330, a depth camera in the illustrated example. The calibration is implemented during the 3D scan of the environment, the camera 30 of the electronic device 100 being fastened on the reference object 780.

The environment E is for example an enclosed space.

It is not outside the scope of the invention for the electronic device not to be fastened to a screen, but to another reference object of the environment.

Figure 9:
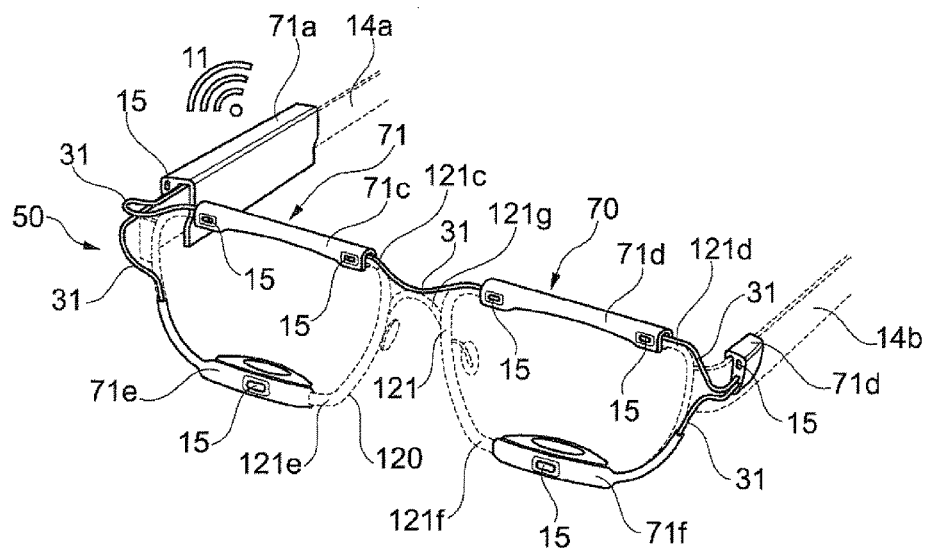
FIG. 9 shows an example portable gaze tracking assembly according to the invention, fastened on a frame.

FIG. 9 shows an example portable gaze tracking assembly 70 according to the invention fastened on a frame 120.

The frame includes a front part 121 and two branches, right 14a and left 14b.

The front part 121 includes an upper right part 121c, an upper left part 121d, a lower right part 121e, a lower left part 121f and a central part 121g.

The portable gaze tracking assembly 70 includes several snapping and/or tightening systems 71, i.e., a right side part 71a fastened by snapping to the right branch 14a, a left side part 71b fastened by tightening to the left branch 14b, an upper right part 71c fastened by snapping to the upper right part of the front part 121c, an upper left part 71d fastened by snapping to the upper left part of the front part 121d, a lower right part 71e fastened by snapping to the lower right part of the front part 121e, a lower left part 71f fastened by snapping to the lower left part of the front part 121f.

Electric wires connect certain pieces of equipment to one another, for example the upper right part 71c to the right side part 71a, to ensure their supply of electricity, for example.

The portable assembly includes a marker 1, in turn including eight light sources 15, forming a visual identification pattern.

Six light sources 15 are positioned at the front part 121 of the frame 120. More specifically, two light sources 15 are positioned in each of the upper right 121c and left 121d parts, and a light source 15 is positioned in each of the lower right 121e and left 121f parts.

Two light sources 15 are positioned at the side parts 71a and 71b, each being fastened on a different side part.

The portable gaze tracking assembly 70 includes an onboard computer (not shown) allowing the determination of the direction of the user's gaze in the plane of reference of the head, a wireless transmitter (not shown) for sending the electronic device 100 a piece of information 11 relative to the direction of the user's gaze, and a battery housed in the right side part 71a.

The left 71f and right 71e lower parts are each provided with a video sensor and an infrared LED (not shown), oriented toward the eye, allowing the observation of the latter. The infrared LED provides appropriate lighting to the sensor, the latter precisely being an infrared camera.

The gaze tracking assembly 70, when mounted on the frame 120, forms a gaze tracking device 50.

The gaze tracking assembly 70 can be adapted to a very wide range of frames and pieces of glass, in particular owing to the different parts 71a to f.

To guarantee an effective determination of the direction of the user's gaze, a calibration phase can be provided after the placement of the gaze tracking assembly 70 on the frame 120.

Figure 10:
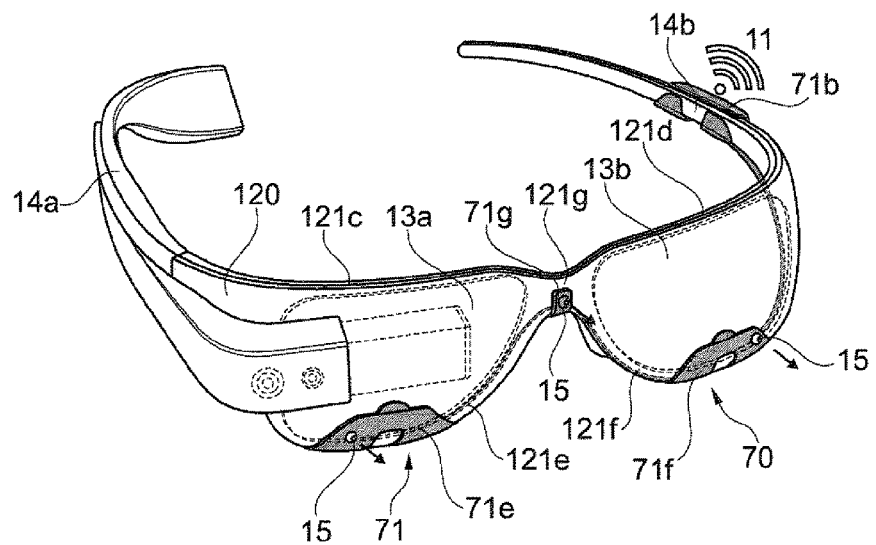
FIG. 10 illustrates an alternative portable gaze tracking assembly according to the invention fastened on a former prototype of the "Google Glass" type.

FIG. 10 illustrates an alternative portable gaze tracking assembly according to the invention, fastened on a former Google Glass prototype.

The portable gaze tracking assembly 70 of FIG. 10 includes a number of snapping and/or tightening systems 71 smaller than that of FIG. 9. The different snapping and/or tightening systems are a left side part 71b fastened by snapping to the left branch 14b, a lower right part 71e fastened by tightening to the lower right part of the front part 121e of the frame 120 on the right piece of glass 13a, a lower left part 71f fastened by tightening to the left inner part of the front part 121f of the frame 120 and the left piece of glass 13b, and a central part 71g fastened by tightening to the central part of the central part 121g of the frame 120.

The portable assembly 70 includes a marker 1 in turn including three light sources 15 forming a visual identification pattern.

The portable gaze tracking assembly 70 is here fastened on a Google Glass, but can be adapted to a very wide range of frames and pieces of glass.

Figure 11:
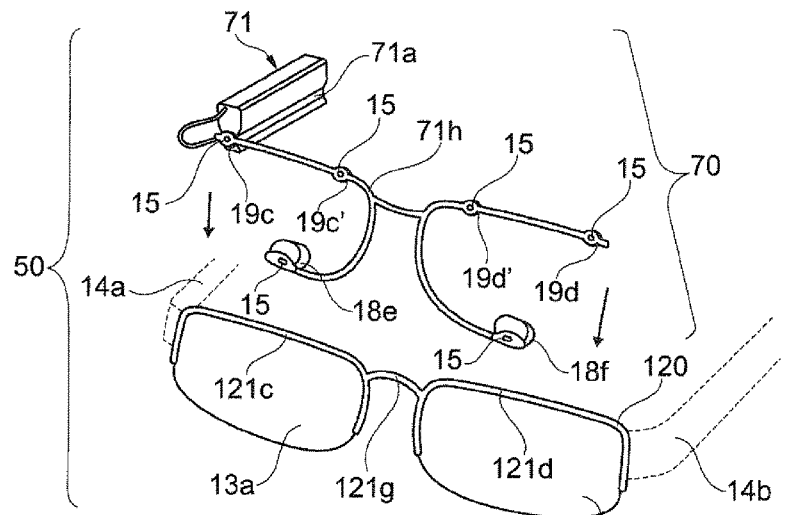
FIG. 11 is another example portable gaze tracking assembly according to the invention as well as a frame and pieces of glass on which it is fastened, FIG. 12 diagrammatically illustrates the fastening of the assembly of FIG. 11 on the frame and pieces of glass of FIG. 12.

In the example of FIG. 11, the different parts 71c, 71d, 71e and 71f of FIG. 9 are replaced by a single part 71h.

The front part 121 of the frame 120 only has an upper right part 121c, an upper left part 121d and a central part 121g. Right 13a and left 13b pieces of glass are fastened to the frame.

The portable gaze tracking assembly 70 includes two snapping and/or tightening systems 71, i.e., a right side part 71a identical to that of FIG. 9, fastened by snapping to the right branch 14a, and the part 71h fastened by snapping and tightening to the frame 120 and the pieces of glass 13a and 13b.

Figure 12:
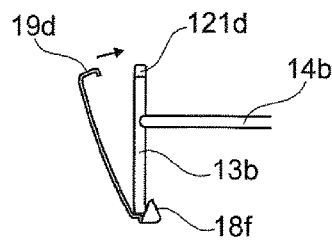

The part 71h includes a lower right slot 18e and a lower left slot 18f, each U-shaped, in which the pieces of glass 13a and 13b are placed, two upper right slots 19c and 19c', each in the shape of an inverted U, which are fastened on the upper right part 121c of the frame 120, and two upper left slots 19d and 19d', each in the form of an inverted U, which are fastened on the upper left part 121d of the frame 120, as illustrated in FIG. 12.

The portable gaze tracking assembly 70 adapts to a range of frames and existing pieces of glass.

Figure 14B:
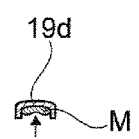
FIG. 14B shows a cross-section along XIV-XIV of part of the portable gaze tracking assembly of FIG. 14A.
Figure 13:
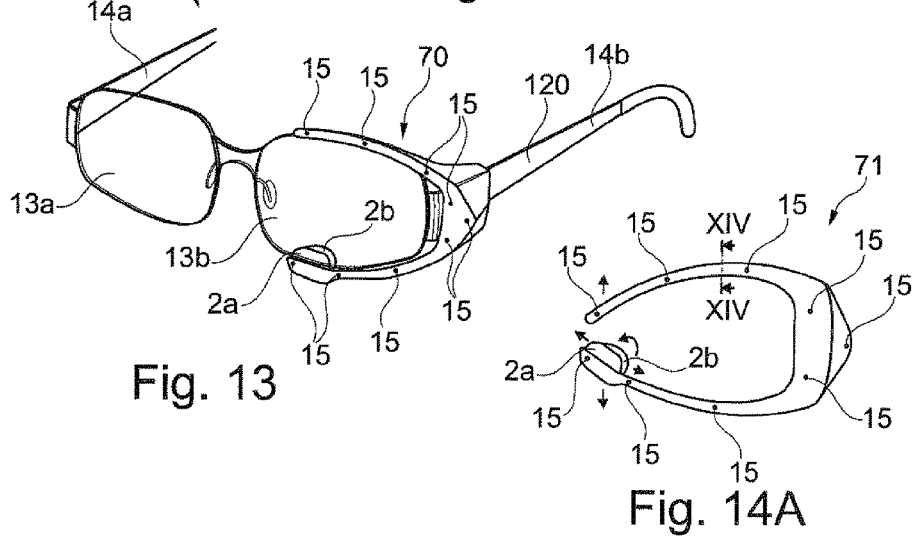
FIG. 13 shows another example portable gaze tracking assembly according to the invention, fastened on a piece of glass.
Figure 14A:
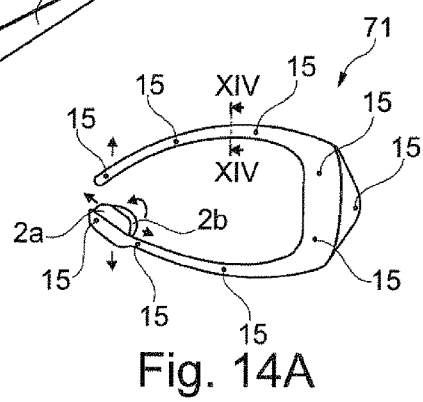
FIG. 14A illustrates the portable gaze tracking assembly of FIG. 13 alone.

FIGS. 13, 14A and 14B illustrate an alternative monocular portable gaze tracking assembly 70 mounted on glasses. The portable gaze tracking assembly 70 is fastened on a single piece of glass 13b.

The portable gaze tracking assembly 70 includes a snapping and tightening system 71 in the form of a part including two uprights 2a and 2b fastened on either side of the piece of glass 13b, at least one of the uprights 2b being able to be inclined such that the piece of glass 13b can be gripped between the two uprights 2a and 2b, an upper slot 19d in the form of an inverted U in which a flexible material M is housed marrying the shape of the piece of glass 13b.

Figure 15:
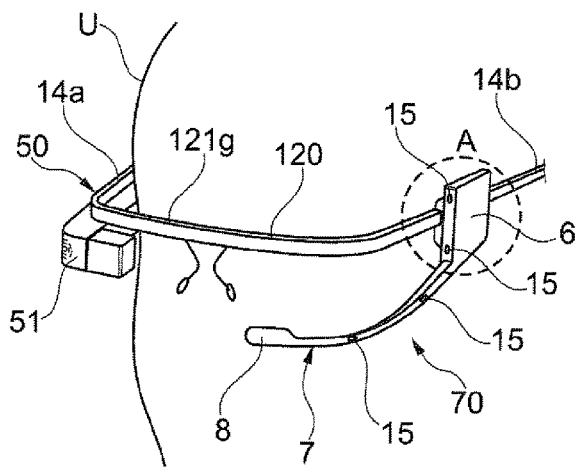
FIG. 15 illustrates an alternative portable gaze tracking assembly according to the invention, fastened on a "Google Glass" model including a sensor, the portable assembly being fastened on the side opposite the sensor and being carried by a user.

FIG. 15 illustrates an example of a portable gaze tracking assembly 70 that is fastened on a Google Glass frame model 120 including a sensory sensor 51.

The frame 120 includes a central part 121g and two branches 14a and 14b.

The portable gaze tracking assembly 70 is fastened on the side opposite the sensory sensor 51.

In the example of FIG. 15, the sensory sensor 51 is situated on the side of the right eye and the portable gaze tracking assembly 70 is thus fastened on the side of the left eye.

The portable gaze tracking assembly 70 includes a tightening system 71 including two parts, inner 3a and outer 3b, tightened relative to one another and around the branch 14b using at least one screw 4.

The portable gaze tracking assembly 70 includes a third part 5 including a case 6 and a rigid arm 7 advancing toward the closest eye, here the left eye.

Figure 16:
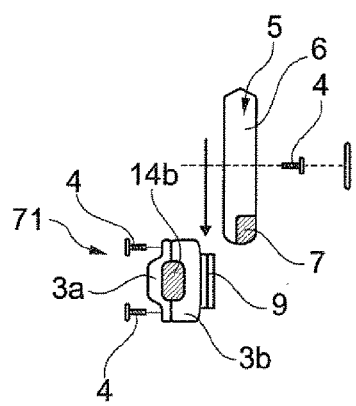
FIG. 16 shows detail A of FIG. 15.
Figure 17:
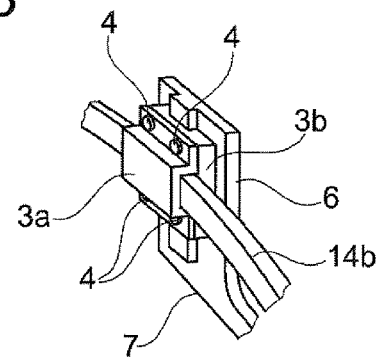
FIG. 17 shows, alone and partially, the portable gaze tracking assembly of FIG. 15, seen from the side.

The outer part 3b includes a guideway 9 in which the case 6 is engaged. The latter is fastened to the outer part 3b using at least one screw 4, as illustrated in FIGS. 16 and 17.

The portable gaze tracking assembly 70 includes a marker 1 in the form of two light sources 15 along the arm 7 and two light sources on the case 6.

The end 8 of the arm 7 houses an optical sensor (not shown) oriented toward the eye.

The case 6 houses an onboard computer, a battery and a wireless transmitter (not shown).

The dimensions of the case 6 in particular depend on the size of the onboard battery.

The portable gaze tracking assembly 70 can be positioned adjustably, in particular in terms of height and along the branch, or in an alternative, non-adjustably. Once it is fastened, it is no longer adjustable.

If the portable gaze tracking assembly 70 is positioned adjustably, the chosen configuration shall be known by the device, for example using parameters measured manually through traditional means, and/or a ruler and/or an automatic calibration procedure.

Figure 18:
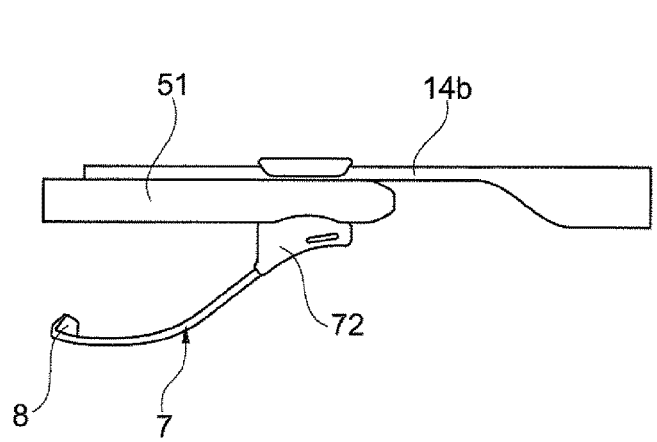
FIG. 18 shows an alternative portable gaze tracking assembly according to the invention, fastened on a "Google Glass" model including a sensor, on the same side as a sensor.
Figure 19:
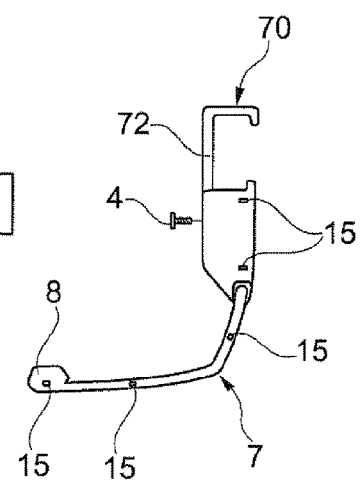
FIG. 19 shows the portable gaze tracking assembly of FIG. 18, alone.

In the example of FIGS. 18 and 19, the portable gaze tracking assembly 70 is fastened this time on the same side as the sensory sensor 51 of the Google Glass.

The portable gaze tracking assembly 70 includes a snapping system 71 including a hook 72 catching on the branch 14b of the frame 120 and the sensory sensor 51. The hook 72 is placed toward the inner side of the branch 14b, in other words toward the user. The snapping system 71 is designed to avoid covering the zone of the sensory sensor 51 of the Google Glass, so as to allow it to be used.

APPLICATION EXAMPLES

Example 1—Environment: Digital Platforms

This example corresponds to an alternative in which the electronic device is fastened on a screen.

The method replaces the use of the mouse, keyboard or touch screen in the use of digital platforms (tablets, computer screens, etc.) for people having reduced or no mobility of the upper limbs (persons with major disabilities, post-stroke, etc.).

Example 2—Environment: Museum or Exhibition, in Particular Exhibition Hall

The user(s) are one or more visitors each provided with a gaze tracking device, including a frame, and an audio device, for example a helmet or earphones.

The audio device is portable and communicates wirelessly with a central information system.

The gaze interaction system includes one or more electronic devices fastened in one or more rooms.

The museum or exhibition site is equipped with as many electronic devices as necessary. In the virtual 3D model of the exhibition site, zones of interest have been identified such as paintings, sculptures, objects, or parts of exhibited items, for example the smile of the Mona Lisa.

When a user gazes at an exhibited work, or part of the work, the system precisely determines where he is gazing, then for example sends him audio commentary relative to that work or the detail being gazed at.

More specifically, the user(s) can act on an on/off switch and a pushbutton, which can be onboard the frame or an additional case carried in the hand, communicating with wires or wirelessly, with the electronic board.

The gaze interaction system can include one light indicator per user, visible by the latter. The light indicator can be carried by the user. The light indicator can be an LED with low lighting oriented toward the user's eye to be able to send him a signal.

The gaze tracking device can be activated or deactivated at the user's discretion using the switch.

When the gaze tracking device is activated and when the user gazes at a known zone of interest, the light indicator lights up, or when there is no light indicator, a sound signal is emitted.

If the user confirms his interest in obtaining the explanation associated with the gazed at element, he presses the pushbutton. An audio message is then broadcast by the audio device.

The message stops when the user presses the pushbutton again, irrespective of the behavior of his gaze during that period of time. If, at that time, the user is still gazing at the same zone of interest, the audio device goes to the "pause" state for a determined period of time. Otherwise, the audio device goes to the "stop" state.

In the "pause" state, the user can resume reading the message by gazing at the zone of interest and pressing the pushbutton. The reading then resumes at the point where it stopped just before, and not at the beginning of the message.

In the "stop" state, the user cannot resume reading where it was stopped. The user can continue his visit, and in particular gaze at the same or another known zone of interest, the light indicator lighting up and the audio message being broadcast under the previously described conditions.

Once the audio message is complete, the user can continue his visit, and in particular gaze at the same or another known zone of interest, the light indicator lighting up and the audio message being broadcast under the previously described conditions.

An audio message can also be transmitted to the user so as to guide his gaze toward a zone of interest. Once the user's gaze is correctly positioned, an audio commentary relative to the zone of interest can be transmitted to the user.

This type of device can be manufactured at a low cost and in multiple copies.

The system makes it possible to manage several users simultaneously carrying gaze tracking devices identifiable by different patterns.

The gaze interaction system also makes it possible to improve the visitor's experience at a location such as a museum or exhibition.

The user's entire visual journey can be recorded.

An overview of the visit upon leaving the museum or exhibition site can be given to the visitor or the institution for statistical purposes. It is for example possible to extract the following data: works gazed at the longest, whether cards were read, time spent in front of each work, etc.

Example 3—Environment: Store or Supermarket

A system according to the invention can be used in consumer behavior studies in stores or supermarkets, in particular to make it possible to improve the arrangement of products on the shelves. Electronic devices according to the invention are distributed within the merchandise displays. The study subjects are given a gaze tracking device and are completely free to move around the environment, not knowing a priori what zones are 'sensitive' experimentation zones, thus making their behavior 'more normal'.

The evaluation metric for subjects in this type of protocol is very sensitive to the degree of acceptance and truthfulness of the subject of the experiment. With a system according to the invention, the setup of the experiment for each subject is quick and easy. The carried gaze tracking device is light and the system used does not require an additional recording case or an onboard scene camera for example, unlike other existing commercially available solutions that prove more bothersome for the tested persons.

Example 4—Environment: Industrial Setting

Another example application relates to collision management between several agents, for example vehicles or robots, and users. An environment of the industrial hanger type includes several agents, each bearing a marker. One or more electronic devices are placed such that they see as much of the environment as possible. They calculate the positions and movement directions by the various agents and users carrying gaze tracking devices. For example, if one feels that a collision between two agents or between an agent and a user is imminent, it notifies the users (alarm signal) or stops the agents.

The invention is not limited to the described example embodiments.

In particular, the gaze tracking device carried by the user can be different from the illustrated gaze tracking devices. The markers can be different, in particular by the nature, number and/or positioning of the light sources.

The expression "including a" must be understood as being synonymous with "including at least one", unless otherwise specified.

The invention claimed is:

1. An electronic device, including:
   a receiver of a piece of information sent by a gaze tracking device, the gaze tracking device being carried by a user moving in a real environment and including a transmitter for transmitting the piece of information to the receiver and a marker forming a visual identification pattern,
   the received piece of information providing information on the direction of the user's gaze in a plane of reference of the gaze tracking device,
   at least one camera for acquiring an image of the marker, the camera being separate from the gaze tracking device,
   a memory storing a digital representation of the environment in a plane of reference specific to the environment,
   a processor configured so as, based on the piece of information received by the receiver, the image of the marker acquired by the at least one camera and the digital representation stored in the memory, to determine, in real-time, the direction of the user's gaze relative to the environment or the zone of the environment gazed at by the user,
   the environment being an enclosed space.

2. The electronic device according to claim 1, including a case incorporating the receiver, the camera, the memory and the processor.

3. The electronic device according to claim 1, the camera including a bimodal system, manual or automatic, for filtering the incident light.

4. The electronic device according to claim 1, the camera being provided with a polarizing filter.

5. The electronic device according to claim 1, including a wireless communication system and/or an interface.

6. The electronic device according to claim 1, each marker including at least one light source emitting in the visible domain, the infrared domain and/or the near infrared domain, chosen from among an LED and a side lighting optical fiber.

7. The electronic device according to claim 1, each marker including at least four light sources.

8. The electronic device of claim 7, each marker including at least four collinear light sources or five coplanar light sources.

9. The electronic device of claim 8, the light sources being periodic.

10. The electronic device according to claim 1, each marker including several light sources and being coded by an amplitude or frequency modulation of the light sources.

11. The electronic device according to claim 1, the electronic device being connected, by a wired or wireless link, to a third-party computer.

12. The electronic device according to claim 1, the memory including data associated with at least one zone of interest of the environment.

13. The electronic device according to claim 2, the processor computing a result depending on whether the zone of interest is gazed at by the user, the result being embodied by a change in state of a logic output, the transmission of a datum, a visual, audio, mechanical or electric effect.

14. A gaze interaction system between one or more users and a real environment in which they are moving, the system including:
   a. a portable gaze tracking device identifiable by a visual marker, carried by each user, the portable gaze tracking device including a transmitter and a marker, the marker forming a visual identification pattern;
   b. at least one electronic device, the at least one electronic device includes:
      a receiver of a piece of information sent by the transmitter,
      the received piece of information providing information on the direction of the user's gaze in a plane of reference of the gaze tracking device,
      at least one camera for acquiring an image of the marker, the camera being separate from the gaze tracking device,
      a memory storing a digital representation of the environment in a plane of reference specific to the environment, a processor configured so as, based on the piece of information received by the receiver, the image of the marker acquired by the at least one camera, and the digital representation stored in the memory, to determine, in real-time, the direction of the user's gaze relative to the environment and/or the zone of the environment gazed at by the user, the environment being an enclosed space.

15. The interaction system according to claim 14, the electronic device being movable in the environment.

16. The interaction system according to claim 13, including several electronic devices configured to exchange data with one another wirelessly.

17. The interaction system according to claim 14, the environment forming a closed space such as a room, hangar, cockpit or vehicle passenger compartment.

18. The interaction system according to claim 14, including:
   c. an audio device intended to emit an audio message to the user,
   d. one button per user intended to be actuated by the latter to trigger or stop the emission of the sound message.

19. A gaze interaction method between a user and a real environment in which the user is moving around, using a system according to claim 14, the method including the following steps:
   a. reception, by the electronic device, of a piece of information that is sent by a portable gaze tracking device carried by the user,
   the received piece of information providing information on the direction of the user's gaze in a plane of reference of the gaze tracking device,
   b. acquisition of at least one image of a marker of the portable device by a camera,
   c. determination by the processor, from the piece of information, of the image and data stored in the memory, of the zone of the environment gazed at by the user.

20. The method according to claim 19, including a computation step by the processor, as a function of the gazed at zone and at least one programmed rule, of at least one result, the transmission of a datum or the stop of its transmission, a visual, audio, mechanical or electric effect, the effect being exogenous or endogenous to the user.

21. The method according to claim 20, the programmed rule consisting, when the user gazes at a predefined zone and shares his interest in receiving a piece of information.

22. The method according to claim 19, including defining and/or updating zones of interest stored in the memory.

23. A method for calibrating an electronic device according to claim 1, for use in an environment allowing the electronic device to compute its position in a plane of reference of the environment, the method including:
   a. acquiring a first image corresponding to the simultaneous viewing, by the camera of the electronic device or a third-party camera, of a marker in a calibration position and a reference object of the environment,
   b. the marker being stationary in the calibration position, acquiring, via the camera of the electronic device secured to the reference object, a second image of the marker.

24. A method for tracking the interest shown by one or several visitors equipped with a gaze tracking device in a given place, including storage of data associated with the gaze of each visitor by the memory of the gaze interaction system according to claim 14.

25. The method according to claim 24, including identification of one or several zones of interest, the storage of data associated with the gaze of each visitor being relative at least in part to each zone of interest.

26. The method according to claim 24, including an export toward a data processing system.

* * * * *